US008649303B2

(12) United States Patent
Danet (10) Patent No.: US 8,649,303 B2
(45) Date of Patent: Feb. 11, 2014

(54) METHOD AND DEVICE FOR SYNCHRONIZING AND TIME-STAMPING FOR EQUIPMENT ITEMS OF A COMMUNICATION NETWORK OF AFDX TYPE

(75) Inventor: Oliver Danet, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 173 days.

(21) Appl. No.: 13/117,779

(22) Filed: May 27, 2011

(65) Prior Publication Data

US 2011/0292842 A1  Dec. 1, 2011

(30) Foreign Application Priority Data

May 27, 2010 (FR) ...................... 10 54079

(51) Int. Cl.
*H04B 1/56* (2006.01)
(52) U.S. Cl.
USPC ....................................... 370/276
(58) Field of Classification Search
USPC ............ 370/276, 324, 350, 395.62, 503–520; 709/208–211; 713/400–401
See application file for complete search history.

(56) References Cited

U.S. PATENT DOCUMENTS

| 4,937,812 | A | * | 6/1990 | Itoh et al. ...................... 370/246 |
| 5,640,388 | A | * | 6/1997 | Woodhead et al. ........... 370/468 |
| 6,002,940 | A | * | 12/1999 | Richter ........................ 455/502 |
| 6,847,691 | B2 | * | 1/2005 | Torikoshi et al. ............. 375/354 |
| 7,590,151 | B2 | * | 9/2009 | Middleton et al. ........... 370/516 |
| 7,716,375 | B2 | * | 5/2010 | Blum et al. ................... 709/248 |
| 7,912,094 | B2 | * | 3/2011 | Hall et al. ..................... 370/508 |
| 2007/0280299 | A1 | | 12/2007 | Latremouille |
| 2008/0025344 | A1 | | 1/2008 | Biederman et al. |
| 2010/0040090 | A1 | * | 2/2010 | Lee et al. ..................... 370/503 |
| 2010/0115047 | A1 | | 5/2010 | Briscoe et al. |

FOREIGN PATENT DOCUMENTS

| EP | 2 187 619 A1 | 5/2010 |
| WO | WO 2008/013744 A2 | 1/2008 |
| WO | WO 2008/013744 A3 | 1/2008 |
| WO | WO 2010/025743 A1 | 3/2010 |

\* cited by examiner

*Primary Examiner* — Mark Rinehart
*Assistant Examiner* — Kenneth P Hunt
(74) *Attorney, Agent, or Firm* — Oblon, Spivak, McClelland, Maier & Neustadt, L.L.P.

(57) ABSTRACT

The invention has in particular as an object the synchronization of a local clock of an equipment item in a communication network according to synchronization frames emitted by a reference equipment item and transmitted via a switch. After it has received (700) a synchronization frame emitted by the reference equipment item and including its time point of emission, the switch transmits (730) the said received synchronization frame after a delay that is fixed, at least on average, counting from the reception of the said synchronization frame by the said switch (725). The local clock of the equipment item, after reception of the said synchronization frame by the equipment item, is synchronized according to the said time point of emission, to the time point of reception of the said synchronization frame and to the said delay.

11 Claims, 7 Drawing Sheets

METHOD AND DEVICE FOR SYNCHRONIZING AND TIME-STAMPING FOR EQUIPMENT ITEMS OF A COMMUNICATION NETWORK OF AFDX TYPE

BACKGROUND OF THE INVENTION

1. Field of the Invention

The present invention relates to synchronization of equipment items in an on-board communication network and more particularly to a method and a device for clock synchronization and time-stamping for equipment items of a communication network of AFDX or Ethernet type.

2. Discussion of the Background

In test, measurement or automation applications, it is frequently necessary to synchronize the local equipment item clocks precisely, so that they share a common time. By way of illustration, such a synchronization mechanism is employed in aircraft test and measurement applications aimed at measurements with strain gauges. It makes it possible to correlate the exchanged data with a time scale.

For these purposes, an equipment item provided with a precise clock, such as an equipment item provided with a GPS receiver (initials for Global Positioning System in English terminology) or connected to such a receiver, is generally responsible for distributing the time to all equipment items involved.

Figure 1:
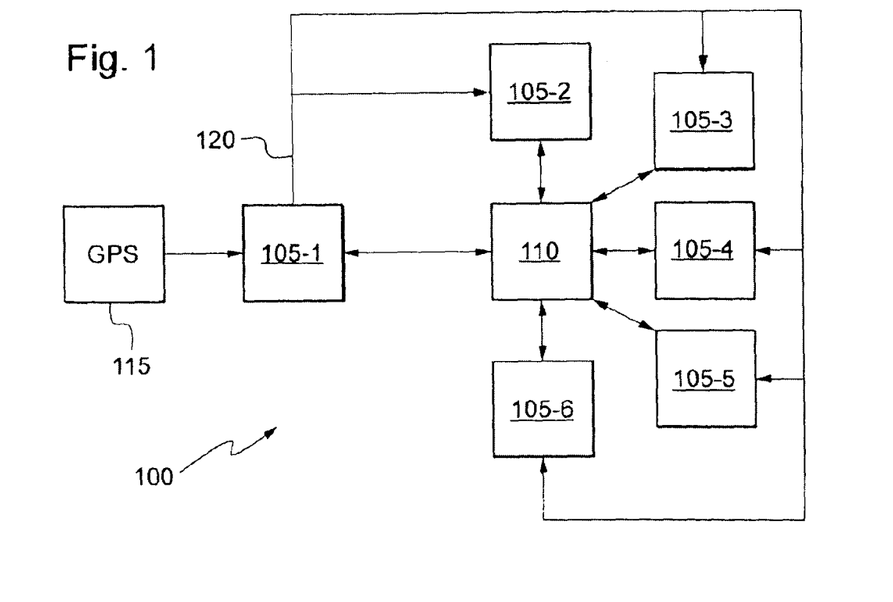
FIG. 1 schematically represents a communication network connecting several equipment items synchronized by a mechanism based on the IRIG 200-98 protocol.

According to a common solution, a dedicated link, which can be precisely characterized in terms of transfer time, is used to assure routing of time-stamping messages. The IRIG protocol (acronym for Inter-Range Instrumentation Group in English terminology) 200-98 uses this principle, which is illustrated in FIG. 1.

In this case, on-board network 100 of AFDX type (initials for Avionics Full-Duplex Switched Ethernet in English terminology) comprises equipment items 105-1 to 105-6, which are interconnected by a switch 110. Since equipment item 105-1 in this case is connected to a GPS receiver 115, it is considered to be the reference equipment item in terms of synchronization. A time-stamping link 120 of "IRIG" type connects equipment item 105-1 to equipment items 105-2 to 105-6, independently of switch 110, or in other words independently of the AFDX links connecting switch 110 to equipment items 105-1 to 105-6.

Reference equipment item 105-1 has the task of distributing a reference clock signal, which originates from a GPS signal received by GPS receiver 115, via specific link 120 to all other equipment items (105-2 to 105-6), to permit synchronization thereof.

Although this solution is simple and effective, it nevertheless has disadvantages associated in particular with the necessity of employing a supplementary link, causing in particular costs for design, manufacture and maintenance.

Another solution consists in using IEEE Standard 1588, which permits precise synchronization and time-stamping via an Ethernet network. This standard is based on routing synchronization messages and time-stamping messages across the same communication network as that used to exchange data. According to this standard, the switches used modify the time-stamping messages to include the time of propagation of synchronization messages. The terminal equipment items collect these messages and determine the precise instant of their reception in order to correct their local clock correspondingly.

This solution assures good performances. However, it is complex to employ and it requires that the switches be capable of generating frames autonomously.

Thus, although solutions exist for synchronizing equipment items in a communication network of Ethernet or AFDX type and for permitting time-stamping of data and events, these solutions are not entirely satisfactory.

SUMMARY OF THE INVENTION

The invention makes it possible to solve at least one of the problems described in the foregoing.

The invention therefore has as an object a method for transmitting synchronization frames in a communication network in order to permit synchronization of a local clock of at least one equipment item connected to the said communication network with a clock of a reference equipment item, which is also connected to the said communication network, the said at least one equipment item, is separate from the said reference equipment item, being connected to the latter via at least one switch, this method, employed in the said at least one switch, comprising the following steps, receiving at least one synchronization frame emitted by the said reference equipment item, the said at least one synchronization frame comprising the time point of emission of the said at least one synchronization frame according to the said clock of the said reference equipment item; and transmitting the said at least one received synchronization frame after a delay that is fixed, at least on average, counting from the reception of the said at least one synchronization frame by the said switch, the local clock of the said at least one equipment item, after reception of the said at least one synchronization frame by the said at least one equipment item, being synchronized according to the said time point of emission, the time point of reception of the said at least one synchronization frame and at least the said delay.

In this way the method according to the invention makes it possible to guarantee a delay that is constant, at least on average, of transmission of synchronization frames used to synchronize local clocks of equipment items in a communication network.

The said delay is advantageously determined according to the length of the longest frame that can be transmitted by the said switch, so that, if the transmission of a frame having the maximum possible size begins at the moment of reception of a synchronization frame, the time of transmission of the received synchronization frame is nevertheless respected.

According to a particular embodiment, the method additionally comprises a step of transmitting part of a frame during the said delay, so that the delay is used advantageously to transmit received data.

According to another particular embodiment, the method additionally comprises a step of calculating an adjustment of the said delay, the said adjustment being related to a delay in transmission of a synchronization frame previously transmitted by the said switch, in order that the delay in transmission of synchronization frames is constant on average.

The invention also has as an object a method for synchronizing a local clock of an equipment item relative to a clock of a reference equipment item, the said equipment item and the said reference equipment item belonging to a communication network and being connected to one another via at least one switch, the said reference equipment item transmitting at least one synchronization frame that includes the time point of emission of the said at least one synchronization frame according to the said clock of the said reference equipment item, the method comprising the following steps, receiving the said at least one synchronization frame emitted by the said reference equipment item;

calculating a theoretical time point of emission of the said at least one synchronization frame according to the time point of reception of the said at least one synchronization frame by the said equipment item and to a fixed delay associated with at least one transmission delay; and synchronizing the said local clock of the said equipment item according to the said theoretical time point of emission and the said time point of emission included in the said at least one synchronization frame, the said switch transmitting the said at least one synchronization frame after the said at least one transmission delay that is fixed, at least on average, counting from the reception of the said at least one synchronization frame by the said switch according to the method described in the foregoing.

In this way the method according to the invention makes it possible to synchronize a local clock of an equipment item connected to a communication network relative to a clock of a separate equipment item, without necessitating a specific link and without the need for the switch used in the communication network to analyze or modify the content of transmitted frames or to generate new frames.

According to a particular embodiment, the method additionally comprises a step of calculating the said delay according to the said transmission delay and the topology of the said communication network.

According to another particular embodiment, the said synchronization step comprises a step of calculating an average of differences between a theoretical time point of emission of a synchronization frame and a corresponding time point of emission included in a synchronization frame, the said average being established for a plurality of received synchronization frames so that, if the delay is constant on average, the synchronization of the local clock is as precise as possible.

The invention also has as an object a computer program comprising instructions adapted to the employment of each of the steps of the method described in the foregoing when the said program is run on a computer, as well as a device comprising means adapted to the employment of each of the steps of this method and an aircraft comprising this device.

The advantages achieved by this computer program, this device and this aircraft are similar to those mentioned in the foregoing.

BRIEF DESCRIPTION OF THE DRAWINGS

Other advantages, objectives and characteristics of the present invention become apparent from the detailed description hereinafter, provided by way of non-limitative example with reference to the attached drawings, wherein.

DESCRIPTION OF THE PREFERRED EMBODIMENTS

The invention has as an object the synchronization of clocks of several equipment items connected to a communication network of AFDX type without necessitating a dedicated link or using a complex protocol. To assure synchronization, the switches used must not modify the messages in transit or generate new messages.

In general, the invention aims at a mechanism wherein the time of transmission of specific messages used for synchronization and time-stamping across a switch of a communication network of AFDX type is constant or is constant on average, regardless of the traffic over the different ports of the switch. For these purposes, the switches used comprise a mechanism wherein the transmission of specific messages used for synchronization and time-stamping is delayed to assure a propagation time that is constant or is constant on average.

Furthermore, the specific messages used for synchronization and time-stamping, emitted by a reference equipment item, include their time point of emission. Thus, knowing the time point of emission of the message, its time point of reception and its time of propagation to a particular equipment item, the latter is able to calculate a time point error by comparing the time point of emission with the time point of reception, from which the time of propagation has been subtracted, and to synchronize itself precisely with the reference equipment item.

It is recalled that the AFDX protocol, described in Part 7 of the ARINC 664 standard, uses the Ethernet communication standard (IEEE Standard 802.3). A communication network of AFDX type is composed of terminal equipment items, also referred to as End Systems in English terminology, and of frame switches, also referred to as Switch in English terminology, interconnected by communication links. Typically, each switch possesses several communication ports connected to equipment items and to other switches.

Figure 2:
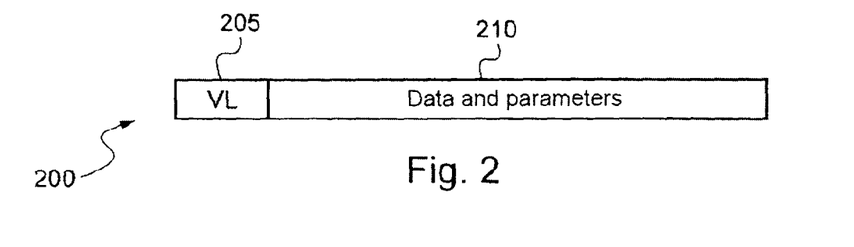
FIG. 2 schematically represents the format of a data frame exchanged in a network of AFDX type.

As illustrated in FIG. 2, each AFDX frame 200 exchanged across the communication network contains a field 205 referred to as VL (initials for Virtual Link in English terminology), which is used by the switches to determine the routing of frames across the network, as well as a field 210 of data and parameters.

At each instant, the switches are made to recopy the received frames to one or more output ports according to a switching table. If several received frames must be routed to the same output port, these frames are stored in the same buffer memory of the switch, to be emitted subsequently. As a result, the time for a frame to transit a switch depends on the traffic over the communication network.

Figure 3:
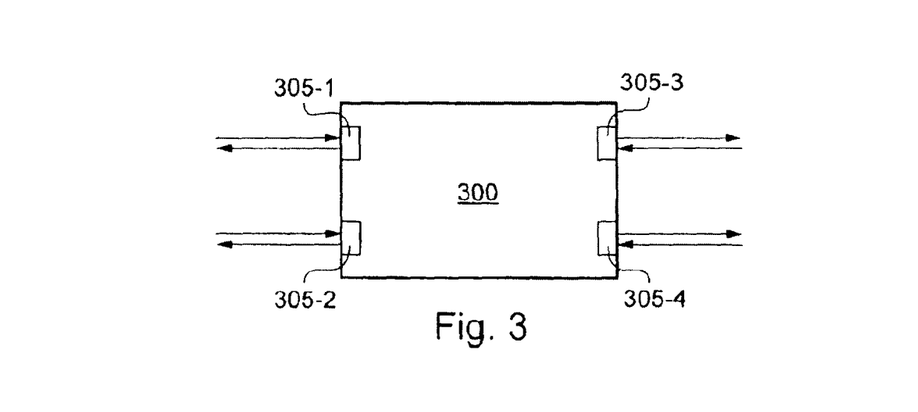
FIG. 3 illustrates an example of a frame switch of a communication network of AFDX type comprising four bidirectional ports.

FIG. 3 illustrates an example of a frame switch of a communication network of AFDX type comprising four bidirectional ports. In this case switch 300 comprises ports 305-1 to 305-4. For example, port 305-1 corresponds to port 1, port 305-2 to port 2, port 305-3 to port 3 and port 305-4 to port 4. When a frame is received over a port, the switch examines the field VL of the received frame and, according to the communication table stored in memory in the switch, determines the output ports over which the received frame must be recopied.

An example of a switching table is given in the Appendix (Table 1). According to this example, the frames whose field VL is equal to one and which are received by port 1 must be transmitted to output ports 2, 3 and 4, the frames whose field VL is equal to two and which are received by port 1 must be transmitted to output port 4, and so on.

Figure 4:
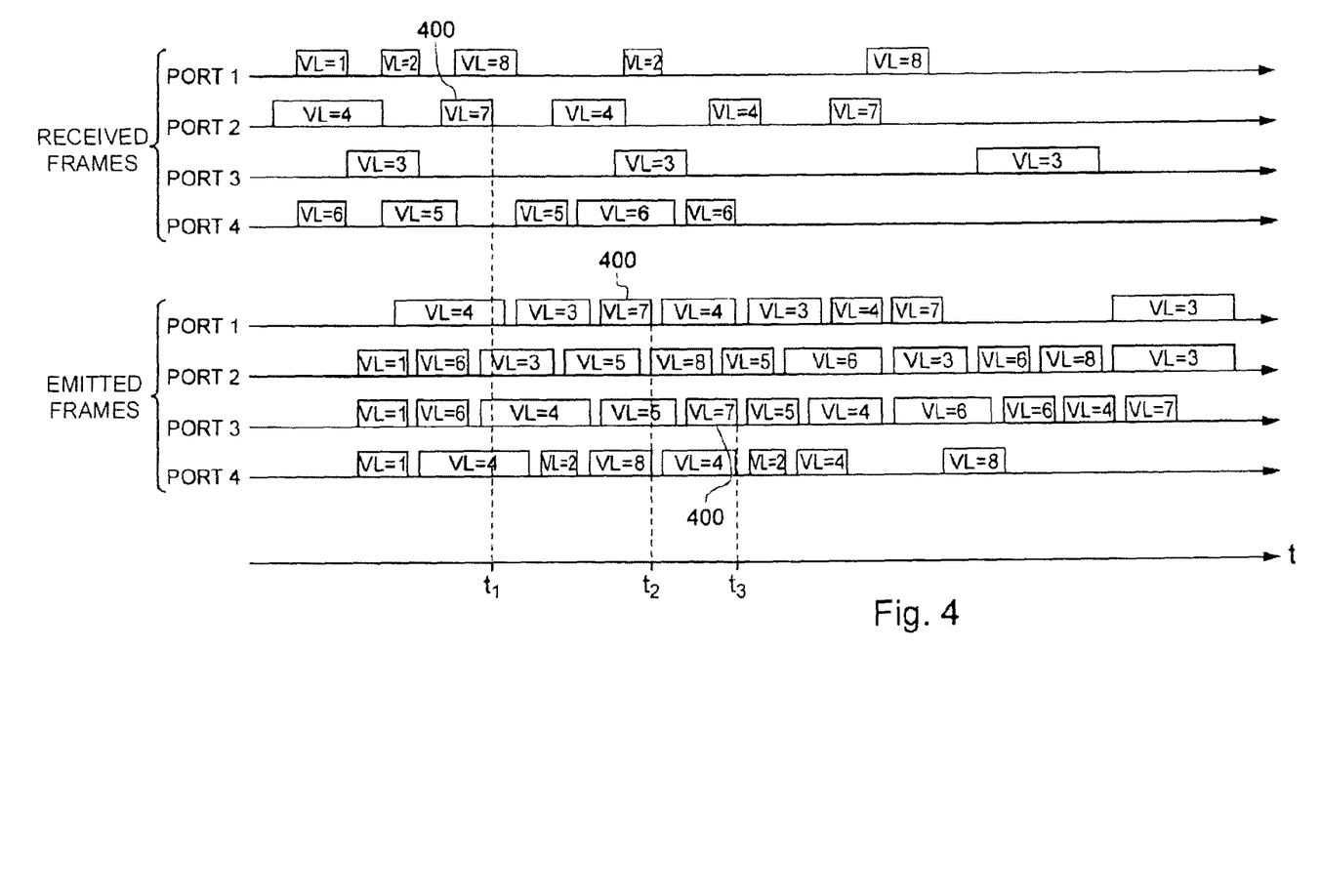
FIG. 4 illustrates an example of traffic in a switch such as that presented in reference to FIG. 3.

FIG. 4 illustrates an example of traffic in a switch such as that presented in reference to FIG. 3. The frames received by each of the ports are transmitted to the other ports according to the value of the field VL of each frame, the reference of the input port and the content of the switching table given in the Appendix.

In this case the first four rows represent the frames received by the four ports of the switch according to time. For example, port 1 receives a frame having a field VL equal to 1, then a frame having a field equal to 2, and so on. The next four rows represent the frames transmitted by the four ports of the switch according to time. For example, port 1 transmits a frame having a field VL equal to 4, then a frame having a field VL equal to 3, and so on.

As represented, the transit time of frames in the switch is variable and depends on the occupancy of the communication network. By way of illustration, frame 400, whose field VL is equal to 7, received over port 2 at instant $t_1$, is emitted by ports 1 and 3, in conformity with the switching table used, at instants $t_2$ and $t_3$ respectively, instant $t_3$ being different from instant $t_2$.

The frame switches of AFDX type generally have several emission queues associated with several priority levels. They determine the priority level of each frame from the content of the field VL.

According to the invention, the specific messages used for synchronization and time-stamping, referred to as synchronization messages or frames, are routed over a high-priority queue and use a reserved value of the field VL. As indicated in the foregoing, and in order to assure a unique clock time for all the equipment items, these messages contain the exact time point of their emission by the reference equipment item.

According to a first embodiment, a switch receiving a synchronization frame waits for a predetermined delay, longer than or equal to the duration of the message of maximum length, before transmitting it. The predetermined delay is, for example, 123 μs for a frame of 1518 bytes when the communication rate of the output ports (or of the slowest output port) is 100 Mbps. The predetermined delay is preferably estimated before frames are exchanged and is stored in memory in each switch. It is noted that the predetermined delays used by each switch of the network may be different, depending on the configuration of the network and on the frame specifications.

During this waiting time, if a frame is in the course of transmission over an output port, its transmission continues normally.

At the end of this delay, the switch transmits the synchronization frame then continues routing the other frames in standard manner.

Each equipment item receiving a synchronization frame must be capable of time-stamping the instant of its reception precisely. To know the theoretical time point of emission of this packet, the equipment item subtracts, from the time point of reception, a fixed delay, which depends on the position of this equipment item in the network and on the rate of each link used for transmission of this frame. This fixed delay can therefore be calculated by summing the transfer times associated with each transited switch and the propagation times associated with each link used.

The time difference between the calculated theoretical time point of emission and the real time point of emission received in the synchronization frame is used to adjust the local clock of the equipment item.

In this way, each equipment item receiving the synchronization message is able to adjust its own clock on the basis of the instant of reception of the synchronization message and of the fixed time of propagation across the network.

Figure 5:
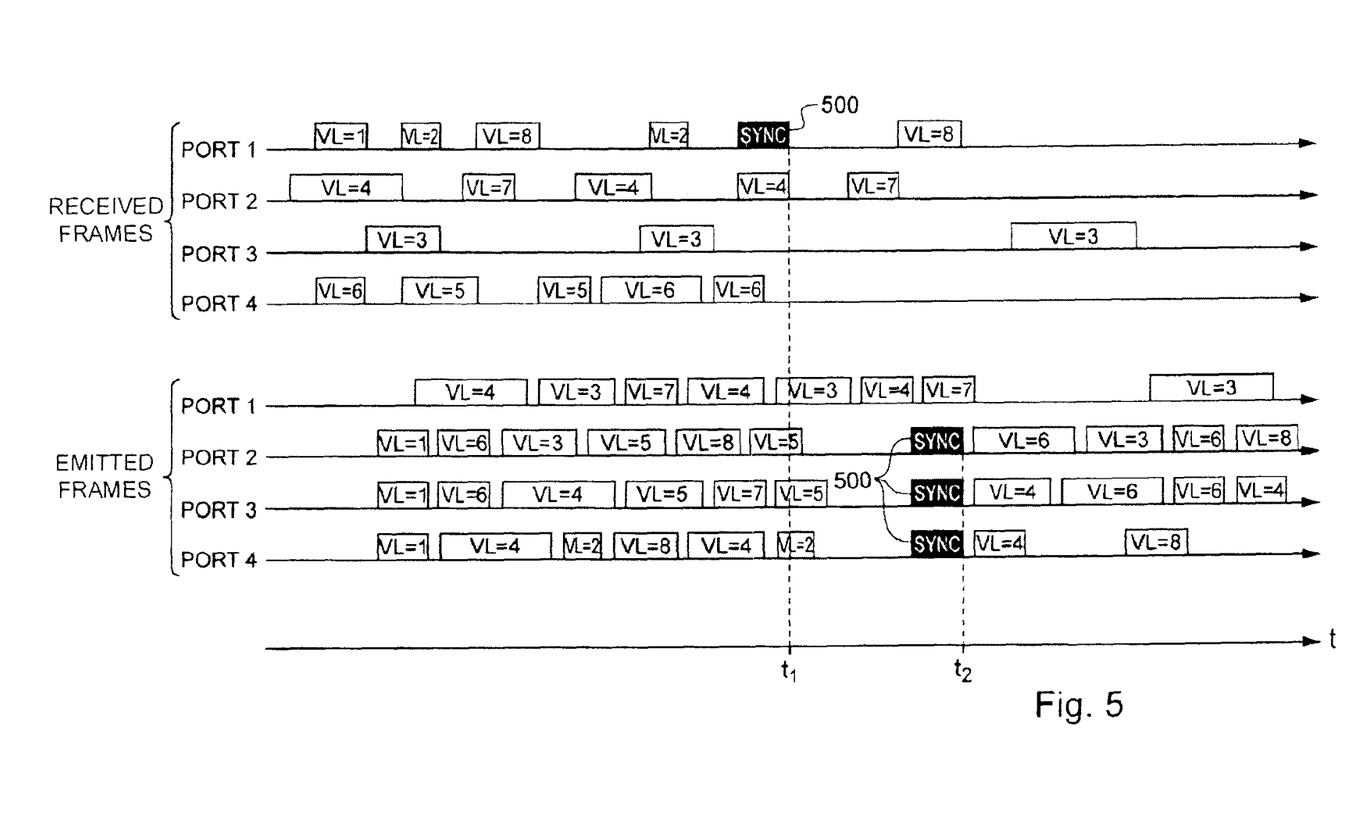
FIG. 5 illustrates an example of transmission of a synchronization frame in a switch such as that presented in reference to FIG. 3.

FIG. 5 illustrates an example of transmission of a synchronization frame 500 in a switch such as presented in reference to FIG. 3. In this case, the frame is received over port 1 at an instant $t_1$ and is transmitted via ports 2, 3 and 4 at the same instant $t_2$. The time difference between the instants $t_1$ and $t_2$ corresponds to the predetermined delay used by the switch.

According to a second embodiment, which may be used in particular when a switch is not capable of guaranteeing a constant propagation delay for each synchronization frame, it is arranged that the average propagation delay will be constant.

Thus, by way of illustration, a switch may be configured to employ a propagation time of 500 μs for the transmission of synchronization frames. If, by reason of internal sequencing mechanisms or of occupancy of the communication network, this frame is effectively transmitted only after 540 μs, the next synchronization frame will have to be transmitted after 460 μs, to compensate for the preceding delay. In this way the propagation delay of each synchronization frame is corrected by the error affecting the propagation delay of the preceding synchronization frame or frames.

The equipment items receiving these synchronization frames form an average of the instants of arrival of the synchronization frames in order to calculate a precise clock time.

It is noted here that the communication network of AFDX type used may be redundant. As the case may be, the synchronization frames are routed simultaneously over both networks. In addition, the equipment item serving as reference for the clock may itself also be redundant, in order to guarantee functioning in the event of a simple fault.

The mechanism according to the invention makes it possible in particular to achieve a precision on the order of 10 microseconds across an entire AFDX network. To improve the precision, it may be necessary to take into account the time of propagation across the cables and components used for adaptation.

Figure 6:
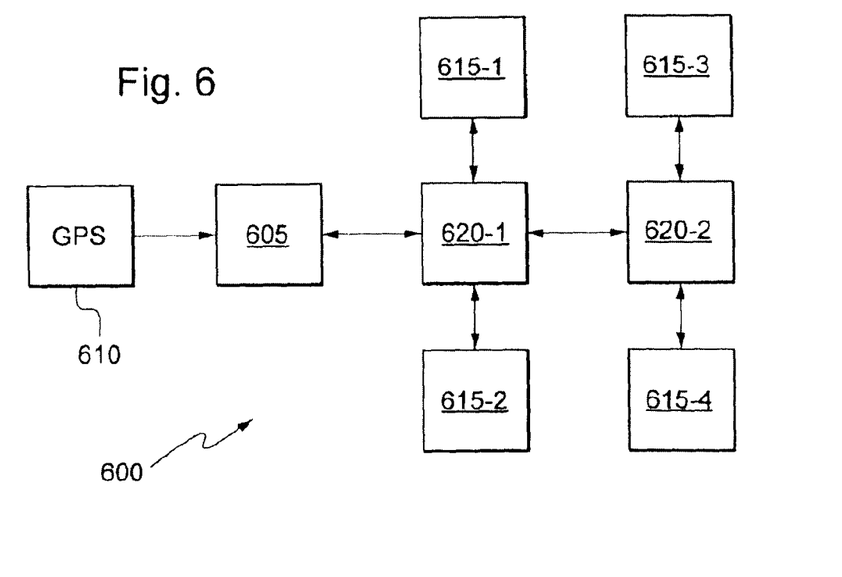
FIG. 6 schematically illustrates an example of a communication network connecting several equipment items synchronized by a mechanism according to the invention.

FIG. 6 schematically illustrates an example of a communication network connecting several equipment items synchronized by a mechanism according to the invention.

Communication network 600 shown here is composed of a reference equipment item 605 connected to a GPS receiver 610, of terminal equipment items 615-1 to 615-4, denoted generically by 615, and of switches 620-1 and 620-2, which interconnect equipment items 605 and 615. Terminal equipment items 615 are provided with mechanisms with which the messages received according to a fixed reception delay can be time-stamped relative to a local clock.

In this case reference equipment item 605 has the task of generating synchronization frames periodically over the communication network of AFDX type. It integrates a precise clock controlled by GPS receiver 610 serving as time reference. This equipment item is in precise control of the instant of emission of synchronization frames. Terminal equipment items 615 receive the synchronization frames generated by reference equipment item 605.

As described in the foregoing, the switches of frames 620-1 and 620-2 are configured such that the synchronization frames will be processed in a dedicated (high-priority) queue, which permits a propagation time that is constant according to a predetermined delay calculated according to the length of the longest transmitted frame and of the rate of the transmission ports. This predetermined delay may in particular be equal to 123 µs if the longest frame is 1518 bytes and the communication rate of the output ports (or of the slowest output port) is 100 Mbps.

As illustrated, equipment items 615-1 and 615-2 receive the synchronization frames from equipment item 605 via switch 620-1, while equipment items 615-3 and 615-4 receive the synchronization frames from equipment item 605 via switches 620-1 and 620-2. Consequently, equipment items 615-1 and 615-2 receive the synchronization frames after a fixed delay of 123 µs (excluding the delay induced by the communication links), and equipment items 615-3 and 615-4 receive the synchronization frames after a fixed delay of 246 µs (again excluding the delay induced by the communication links), which corresponds to the sum of the delays of 123 µs induced by switches 620-1 and 620-2. Knowing these delays as well as the time point of emission of the synchronization frames and their time point of reception, equipment items 615 are able to adjust their local clock.

Figure 7:
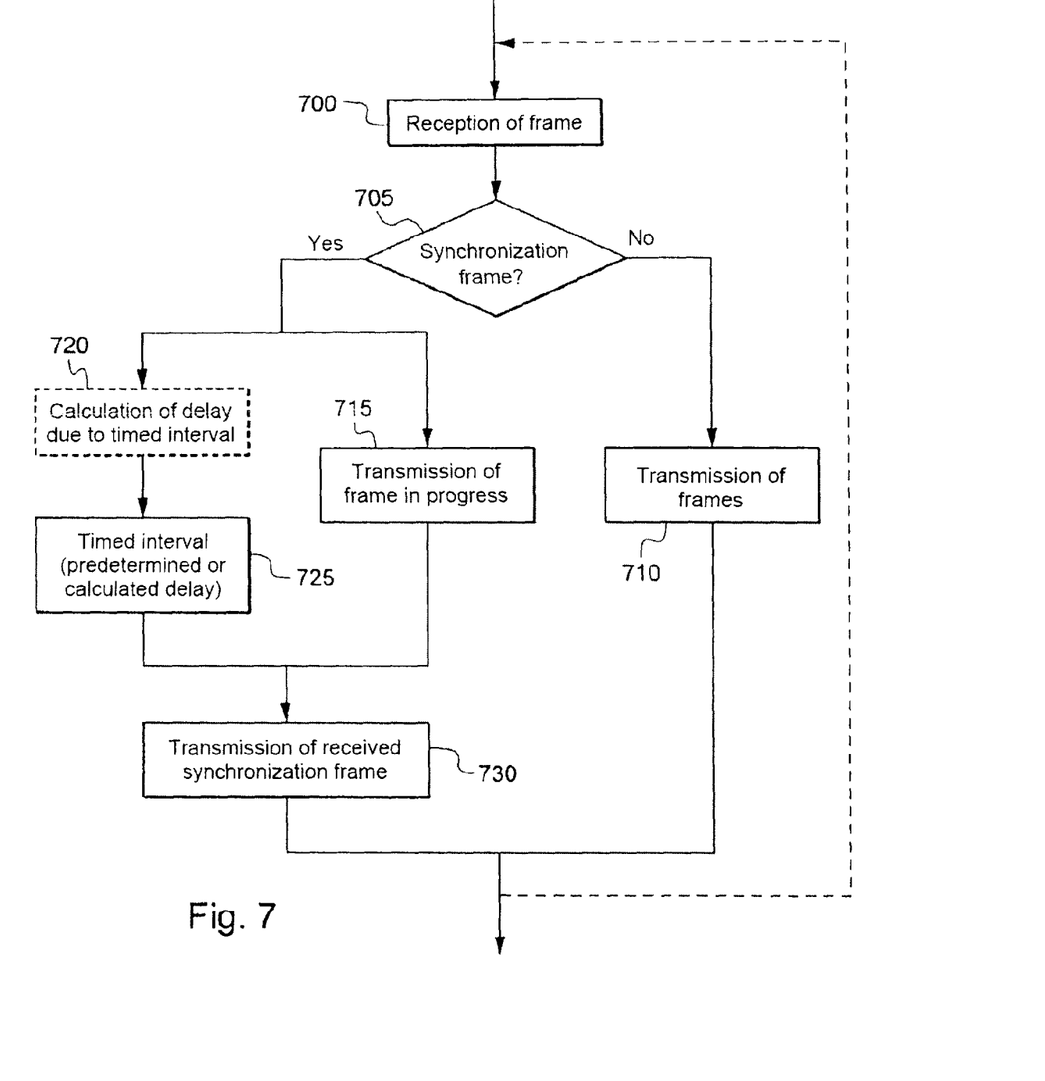
FIG. 7 schematically illustrates an example of certain steps of a method employed in a switch for transmitting synchronization frames according to a delay that is constant or is constant on average.

FIG. 7 schematically illustrates an example of certain steps of the method employed in a switch for transmitting synchronization frames according to a delay that is constant or is constant on average.

As illustrated, a first step has as its object the reception of a frame (step 700). The nature of this frame is then tested to determine whether or not it is a synchronization frame (step 705). As indicated in the foregoing, a synchronization frame preferably includes a field VL having a particular value with which it can be identified.

If the received frame is not a synchronization frame, the frame in the course of transmission and the frames previously received and stored in memory are transmitted in standard manner (step 710).

On the contrary, if the received frame is a synchronization frame, and if a frame is in the course of transmission, this frame continues to be transmitted in standard manner (step 715). In parallel, a time counter is started to impose a timed interval, whose length is defined according to a predetermined delay if the switch is capable of transmitting a frame precisely after such a delay or otherwise after a calculated delay (step 725).

If the timed interval is imposed according to a calculated delay, this delay is calculated beforehand (step 720). This calculation consists in determining the delay observed for the transmission of the preceding synchronization frame and in comparing this delay with the predetermined delay, in order to calculate the optimum delay by which, after transmission of the synchronization frame in progress, the average delay observed before the transmission of the synchronization frames will be as close as possible to the predetermined delay. This calculated delay is preferably longer than a first predetermined threshold and shorter than a second predetermined threshold, in order to avoid a synchronization error. In other words, each transmission of a synchronization frame must compensate, as the case may be, for the time shift of the transmission of the preceding synchronization frame.

Thus, by way of illustration, if the nominal delay in transmission of a synchronization frame is 500 µs, and if the first synchronization frame is transmitted after 520 µs, a delay of 20 µs (520−500) must be made up. The transmission delay of the second synchronization frame must therefore be 480 µs (500−20). If the second frame is transmitted after 400 µs, a time lead of 80 µs (400−480) now exists. The transmission delay of the third synchronization frame must therefore be 580 µs (500+80). If the third synchronization frame is effectively transmitted with a delay of 580 µs, the transmission delay of the synchronization frames is constant on average ((520+400+580)/3=500 µs). In addition, the precision of this average is bounded and does not depend on the traffic over the network.

When the predetermined or calculated delay has elapsed, or in other words at the end of the timed interval, the synchronization frame is transmitted in standard manner over the ports defined in the switching table being used (step 730).

As shown by the dashed arrow, the process continues as long as it is not stopped and frames are being received.

Figure 8:
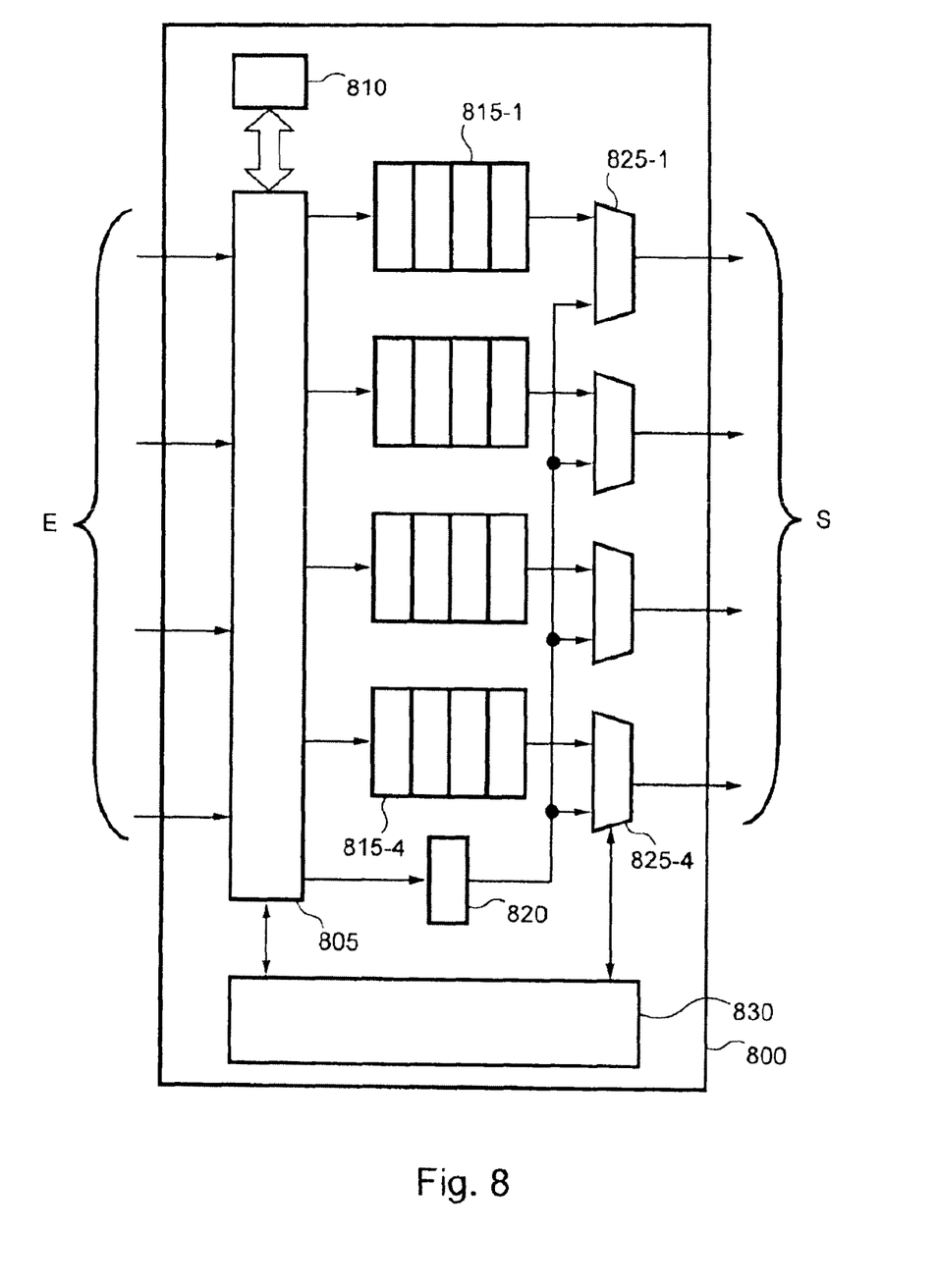
FIG. 8 illustrates an example of the architecture of a switch adapted to employ the algorithm described in reference to the preceding figure.

A switch adapted to transmit synchronization frames according to a delay that is constant or is constant on average and conforming, for example, to the algorithm illustrated in FIG. 7, is shown in FIG. 8.

This switch 800 has four input ports E and four output ports S. It comprises a switching element 805, a configuration memory 810, a plurality of buffer memories or queues 815-1 to 815-4, denoted generically by 815, a buffer memory 820, a plurality of multiplexers 825-1 to 825-4, denoted generically by 825, and a central control system 830, such as a microcontroller.

Switching element 805 is controlled by the central control system it recopying the data packets received at the input to the output ports, via buffer memories 815-1 to 815-4 and 820, according to configuration data in this case stored in configuration memory 810. Buffer memories 815-1 to 815-4 are each associated with an output port. They are used to store data packets received from switching element 805 and ready to be re-emitted to the corresponding output port. Buffer memory 820 is also connected to each output port. It is used to store synchronization frames received from switching element 805 and ready to be re-emitted to the output ports.

Each output port is connected to a buffer memory 815 and to buffer memory 820 via a multiplexer 825 controlled by central control unit 830, which selects the data transmitted over each output port in order, in particular, to start delayed transmission of synchronization frames.

Figure 9:
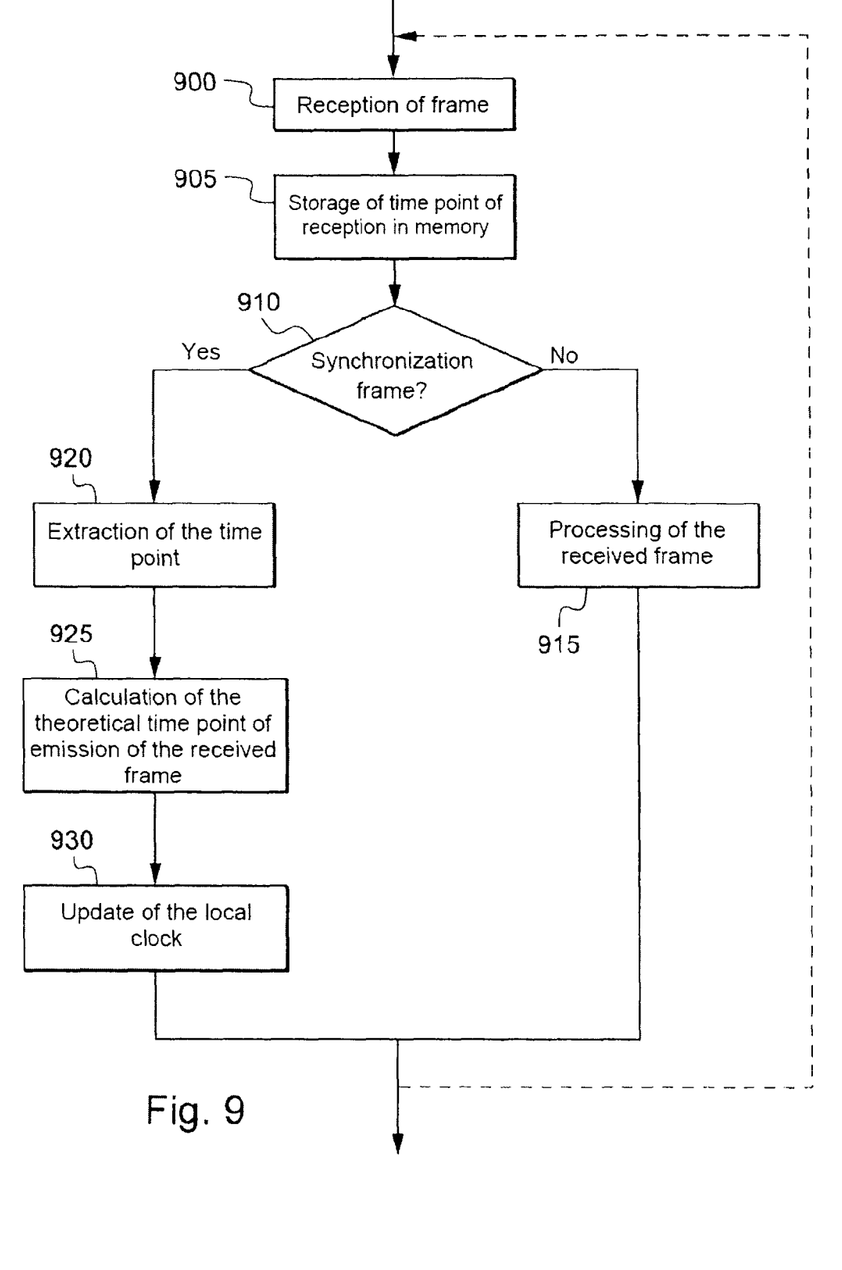
FIG. 9 schematically illustrates an example of certain steps of the algorithm employed in an equipment item for synchronizing its local clock according to a received synchronization frame; and, FIG. 10 illustrates an example of architecture of an equipment item adapted to employ the algorithm described in reference to FIG. 9.

FIG. 9 schematically illustrates an example of certain steps of the algorithm employed in an equipment item to synchronize its local clock according to a received synchronization frame.

During reception of a frame (step 900), its time point of reception is temporarily stored in memory (step 905). A test is then performed to determine the nature of the received frame (step 910), or in other words to determine whether or not this is a synchronization frame. As described in the foregoing, a synchronization frame preferably includes a field VL having a particular value with which it can be identified.

If the received frame is not a synchronization frame, it is processed in standard manner (step 915) and its time point of reception is ignored.

On the contrary, if the received frame is a synchronization frame, the time point of emission of the frame, contained in its field of data and parameters, is extracted (step 920). The theoretical time point of emission of the frame is then calculated (step 925) by subtraction of the transmission delay from the time point of reception stored in memory. As indicated in the foregoing, the transmission delay is constant. It is calculated according to the topology of the communication network and the transmission delays of each switch transited by the received synchronization frame. The theoretical time point of emission is then compared with the time point of emission received in the synchronization frame, in order to update the local clock of the equipment item (step 930).

As shown by the dashed arrow, the process continues as long as it is not stopped and frames are being received.

Figure 10:
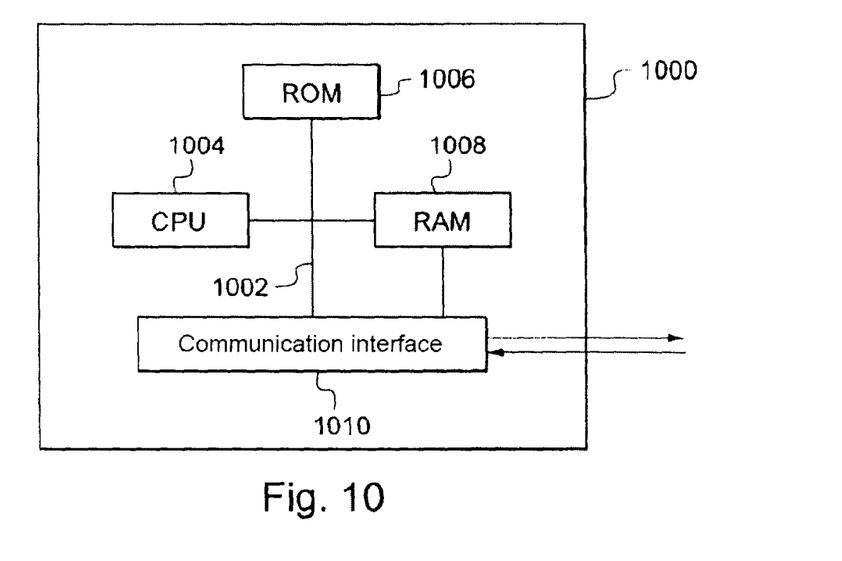

An exemplary architecture of an equipment item adapted for implementing the algorithm described with reference to FIG. 9 is illustrated on FIG. 10.

Device 1000 here comprises a communication bus 1002 to which there are connected:
- a central processing unit or microprocessor 1004 (CPU, Central Processing Unit);
- a read-only memory 1006 (ROM, acronym for Read Only Memory in English terminology) able to comprise the programs implementing an algorithm similar to the one shown on FIG. 9;
- a random access memory or cache memory 1008 (RAM, acronym for Random Access Memory in English terminology) comprising registers adapted for recording variables and parameters created and modified in the course of running the aforesaid programs; and
- a communication interface 1010 adapted for transmitting and receiving data.

The data and synchronization frames thus are received via interface 1010, stored in memory 1008 to be analyzed according to the algorithm described above and to allow updating of the local clock.

The communication bus allows communication and interoperability among the various components included in device 1000 or connected thereto. The depiction of the bus is not limitative and, in particular, the central unit is able to communicate instructions to any component of device 1000 directly or via another component of device 1000.

The executable code of each program allowing the programmable device to implement the processes according to the invention may be stored, for example, in read-only memory 1006.

According to another variant, the executable code of the programs will be able to be received, at least partially, via interface 1010.

More generally, the program or programs will be able to be loaded into one of the storage means of device 1000 before being run.

Central unit 1004 is going to control and direct the running of the instructions or portions of software code of the program or programs according to the invention, which instructions are stored in read-only memory 1006 or in other storage components. During boot-up, the program or programs that are stored in a non-volatile memory, for example read-only memory 1006, are transferred to random access memory 1008 which then contains the executable code of the program or programs according to the invention, as well as registers for storing the variables and parameters necessary for implementation of the invention.

Naturally, to satisfy specific needs, an individual competent in the field of the invention will be able to apply modifications in the foregoing description.

TABLE 1

| APPENDIX | | |
|---|---|---|
| VL | "Source" port | "Destination" ports |
| 1 | 1 | 2, 3, 4 |
| 2 | 1 | 4 |
| 3 | 3 | 1, 2 |
| 4 | 2 | 1, 3, 4 |
| 5 | 4 | 2, 3 |
| 6 | 4 | 2, 3 |
| 7 | 2 | 1, 3 |
| 8 | 1 | 2, 4 |

The invention claimed is:

1. A method for transmitting synchronization frames in a communication network in order to permit synchronization of a local clock of at least one equipment item connected to the communication network with a clock of a reference equipment item also connected to the communication network, the at least one equipment item, separate from the reference equipment item, being connected to the reference equipment item via at least one switch, the method, employed in the at least one switch, comprising:
    calculating a calculated transmission delay to be different than a fixed transmission delay when a previous transmission delay of a synchronization frame that was previously transmitted by the at least one switch is also different than the fixed transmission delay;
    receiving at least one synchronization frame emitted by the reference equipment item, the at least one synchronization frame including a time point of emission of the at least one synchronization frame according to the clock of the reference equipment item; and
    transmitting the at least one received synchronization frame after the calculated transmission delay from the reception of the at least one synchronization frame by the switch,
    the local clock of the at least one equipment item, after reception the receiving of the at least one synchronization frame by the at least one equipment item, being synchronized according to at least the time point of emission, a time point of reception of the at least one synchronization frame at the at least one equipment item, and the fixed transmission delay.

2. The method according to claim 1, wherein the calculated transmission delay is determined according to a length of a longest frame that can be transmitted by the switch.

3. The method according to claim 1, additionally comprising:
    transmitting part of a frame during the calculated transmission delay.

4. A method for synchronizing a local clock of an equipment item relative to a clock of a reference equipment item, the equipment item and the reference equipment item belonging to a communication network and being connected to one another via at least one switch, the reference equipment item transmitting at least one synchronization frame that includes the time point of emission of the at least one synchronization frame according to the clock of the reference equipment item, the method comprising:
    receiving the at least one synchronization frame emitted by the reference equipment item;
    calculating a theoretical time point of emission of the at least one synchronization frame according to the time point of reception of the at least one synchronization frame by the equipment item and a fixed transmission delay associated with at least one calculated transmission delay; and synchronizing the local clock of the equipment item according to the said theoretical time point of emission and the time point of emission included in the at least one synchronization frame, the at least one switch transmitting the at least one synchronization frame after the at least one calculated transmission delay counting from the reception of the at least one synchronization frame at the at least one switch, wherein the calculated transmission delay is calculated to be different than the fixed transmission delay when a previous transmission delay of a synchronization frame that was previously transmitted by the at least one switch is also different than the fixed transmission delay.

5. The method according to claim 1, additionally comprising:

calculating the calculated transmission delay according to the fixed transmission delay and a topology of the communication network.

6. A non-transitory computer readable medium storing instructions, which when executed by a computer cause the computer to perform steps comprising:

calculating a calculated transmission delay to be different than a fixed transmission delay when a previous transmission delay of a synchronization frame that was previously transmitted by at least one switch is also different than the fixed transmission delay;

receiving at least one synchronization frame emitted by a reference equipment item, the at least one synchronization frame including a time point of emission of the at least one synchronization frame according to a clock of the reference equipment item; and transmitting the at least one received synchronization frame after the calculated transmission delay from reception of the at least one synchronization frame by the switch, a local clock of at least one equipment item, after the receiving of the at least one synchronization frame by the at least one equipment item, being synchronized according to at least the time point of emission, a time point of reception of the at least one synchronization frame at the at least one equipment item, and the fixed transmission delay.

7. An aircraft comprising:

a switch for transmitting synchronization frames in a communication network in order to permit synchronization of a local clock of at least one equipment item connected to the communication network with a clock of a reference equipment item also connected to the communication network the equipment item being connected to the reference equipment item by the switch, the switch including a calculating section configured to calculate a transmission delay calculating a calculated transmission delay to be different than a fixed transmission delay when a previous transmission delay of a synchronization frame that was previously transmitted by the at least one switch is also different than the fixed transmission delay, a receiver that receives at least one synchronization frame emitted by the reference equipment item, the at least one synchronization frame including a time point of emission of the at least one synchronization frame according to the clock of the reference equipment item, and a transmitter that transmits the at least one received synchronization frame after the calculated transmission delay from the reception of the at least one synchronization frame by the switch, wherein the local clock of the at least one equipment item, after receiving the at least one synchronization frame by the at least one equipment item, is synchronized according to at least the time point of emission, a time point of reception of the at least one synchronization frame at the at least one equipment item, and the fixed transmission delay.

8. A switch for transmitting synchronization frames in a communication network in order to permit synchronization of a local clock of at least one equipment item connected to the communication network with a clock of a reference equipment item also connected to the communication network, the equipment item being connected to the reference equipment item by the switch, the switch comprising:

a calculating section configured to calculate a transmission delay calculating a calculated transmission delay to be different than a fixed transmission delay when a previous transmission delay of a synchronization frame that was previously transmitted by the at least one switch is also different than the fixed transmission delay;

a receiver that receives at least one synchronization frame emitted by the reference equipment item, the at least one synchronization frame including a time point of emission of the at least one synchronization frame according to the clock of the reference equipment item, and a transmitter that transmits the at least one received synchronization frame after the calculated transmission delay from the reception of the at least one synchronization frame by the switch, wherein the local clock of the at least one equipment item, after receiving the at least one synchronization frame by the at least one equipment item, is synchronized according to at least the time point of emission, a time point of reception of the at least one synchronization frame at the at least one equipment item, and the fixed transmission delay.

9. The method according to claim 1, wherein the calculating further calculates the calculated transmission delay to be different than the fixed transmission delay by an amount equal to a difference between the previous transmission delay and the fixed transmission delay.

10. The method according to claim 1, wherein the calculating further calculates the calculated transmission delay to be greater than the fixed transmission delay when the previous transmission delay of the synchronization frame that was previously transmitted by the at least one switch is less than the fixed transmission delay.

11. The method according to claim 1, wherein the calculating further calculates the calculated transmission delay to be less than the fixed transmission delay when the previous transmission delay of the synchronization frame that was previously transmitted by the at least one switch is greater than the fixed transmission delay.

* * * * *